US011978455B2

(12) United States Patent
Peeler et al.

(10) Patent No.: US 11,978,455 B2
(45) Date of Patent: *May 7, 2024

(54) INFORMATION HANDLING SYSTEMS AND METHODS FOR ACCURATELY IDENTIFYING AN ACTIVE SPEAKER IN A COMMUNICATION SESSION

(71) Applicant: DELL PRODUCTS L.P., Round Rock, TX (US)

(72) Inventors: Douglas J. Peeler, Austin, TX (US); Srinivas Kamepalli, Austin, TX (US)

(73) Assignee: Dell Products L.P.

( * ) Notice: Subject to any disclaimer, the term of this patent is extended or adjusted under 35 U.S.C. 154(b) by 70 days.

This patent is subject to a terminal disclaimer.

(21) Appl. No.: 17/688,622

(22) Filed: Mar. 7, 2022

(65) Prior Publication Data

US 2022/0189489 A1 Jun. 16, 2022

Related U.S. Application Data

(62) Division of application No. 16/114,841, filed on Aug. 28, 2018, now Pat. No. 11,289,097.

(51) Int. Cl.
*G10L 17/04* (2013.01)
*G10L 17/00* (2013.01)
(Continued)

(52) U.S. Cl.
CPC ............. *G10L 17/04* (2013.01); *G10L 17/00* (2013.01); *G10L 17/24* (2013.01); *H04L 67/306* (2013.01); *H04M 3/568* (2013.01)

(58) Field of Classification Search
None
See application file for complete search history.

(56) References Cited

U.S. PATENT DOCUMENTS 5,606,643 A 2/1997 Balasubramanian et al.
5,659,662 A 8/1997 Wilcox et al.
(Continued)

OTHER PUBLICATIONS

Wikipedia, "Multi-factor Authentication", saved from Internet on Aug. 27, 2018, 10 pgs.

*Primary Examiner* — Neeraj Sharma
(74) *Attorney, Agent, or Firm* — Egan, Enders & Huston LLP.

(57) ABSTRACT

The present disclosure provides various embodiments of methods for intelligent active speaker identification and information handling systems (IHSs) utilizing such methods. In general, the methods disclosed herein may be used to accurately identify an active speaker in a communication session with an application or an IHS, regardless of whether the active speaker is alone, in a group environment, or using someone else's system or login to participate in the communication session. The methods disclosed herein may use voice processing technology and one or more voice identification databases (VIDs) to identify the active speaker in a communication session. In some embodiments, the disclosed methods may display the identity of the active speaker to other users or participants in the same communication session. In other embodiments, the disclosed methods may dynamically switch between user profiles or accounts during the communication session based on the identity of the active speaker.

17 Claims, 6 Drawing Sheets

(51) Int. Cl.
*G10L 17/24* (2013.01)
*H04L 67/306* (2022.01)
*H04M 3/56* (2006.01)

(56) References Cited

U.S. PATENT DOCUMENTS

| | | | |
|---|---|---|---|
| 5,940,476 A | 8/1999 | Morganstein et al. | |
| 6,804,330 B1 | 10/2004 | Jones et al. | |
| 6,853,716 B1 | 2/2005 | Shaffer et al. | |
| 6,873,951 B1 | 3/2005 | Lin et al. | |
| 6,882,971 B2 | 4/2005 | Craner | |
| 6,983,248 B1* | 1/2006 | Tahara | G10L 15/187 704/E15.02 |
| 7,792,263 B2 | 9/2010 | D'Amora et al. | |
| 8,140,340 B2* | 3/2012 | Bhogal | G10L 17/00 704/275 |
| 9,123,330 B1 | 9/2015 | Sharifi et al. | |
| 9,191,616 B2 | 11/2015 | Krantz | |
| 9,264,550 B2 | 2/2016 | Kaye et al. | |
| 9,338,027 B2 | 5/2016 | Talwar et al. | |
| 10,074,089 B1* | 9/2018 | Rangaraj | G06Q 20/40145 |
| 2003/0110034 A1 | 6/2003 | Runge et al. | |
| 2010/0085415 A1 | 4/2010 | Rahman | |
| 2011/0093266 A1 | 4/2011 | Tham | |
| 2011/0145000 A1* | 6/2011 | Hoepken | G10L 15/22 704/275 |
| 2012/0253809 A1 | 10/2012 | Thomas et al. | |
| 2013/0226576 A1 | 8/2013 | Jaiswal et al. | |
| 2014/0095169 A1* | 4/2014 | Summerfield | G10L 17/00 704/273 |
| 2014/0297528 A1* | 10/2014 | Agrawal | G06Q 20/40145 705/44 |
| 2016/0078864 A1* | 3/2016 | Palanisamy | G10L 15/08 704/235 |
| 2016/0275952 A1 | 9/2016 | Kashatan et al. | |
| 2018/0167490 A1 | 6/2018 | Morton et al. | |
| 2018/0173494 A1* | 6/2018 | Choi | G10L 15/30 |
| 2019/0066680 A1* | 2/2019 | Woo | G10L 15/08 |
| 2019/0182176 A1 | 6/2019 | Niewczas | |
| 2019/0341059 A1 | 11/2019 | Moreno et al. | |
| 2020/0075026 A1 | 3/2020 | Peeler et al. | |

* cited by examiner

INFORMATION HANDLING SYSTEMS AND METHODS FOR ACCURATELY IDENTIFYING AN ACTIVE SPEAKER IN A COMMUNICATION SESSION

RELATED APPLICATIONS

This patent application is a divisional of U.S. patent application Ser. No. 16/114,841, titled "INFORMATION HANDLING SYSTEMS AND METHODS FOR ACCURATELY IDENTIFYING AN ACTIVE SPEAKER IN A COMMUNICATION SESSION", by Douglas J. Peeler et al., filed on Aug. 28, 2018, which is incorporated herein by reference in its entirety for all purposes.

FIELD OF THE INVENTION

This invention relates generally to information handling systems, and more particularly to methods to accurately identify an active speaker in a communication session and information handling systems utilizing such methods.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Telecommunication systems have long been used to enable real-time communication between a plurality of remotely located users participating, for example, in a teleconference, video conference, or internet teleconference (collectively referred to as a teleconference). As shown in FIG. 1, users 10 participating in a teleconference may use a variety of different information handling systems (IHSs) 12 and communication technologies/networks to connect to, and communicate with, a telecommunication system 14. For example, users 10 may use a cellular device 12 (e.g., a smart phone or tablet) to communicate with telecommunication system 14 via any known cellular communication technology or network 16, or a telephone 12 to communicate with telecommunication system 14 via a public switched telephone network (PSTN) 18. In addition, users 10 may use a laptop, tablet or desktop computer 12 to communicate with telecommunication system 14 via one or more networks 20, which may include personal area networks (PANs), local area networks (LANs) and/or wide area networks (WANs).

Internet teleconferencing, which involves conducting a teleconference over the Internet (or another WAN), is often implemented using Voice over Internet Protocol ("Voice over IP", or "VOIP") technologies and conferencing applications. Today, most VOIP conferencing applications like Skype, WebEx, etc., identify the person currently talking (i.e., the active speaker) by their login source, user account/profile, phone number, etc. Unfortunately, currently available VOIP teleconferencing applications cannot accurately identify the active speaker in all situations. For example, if Joe joins the teleconference using Jane's phone, computer or Skype account, the VOIP teleconferencing application will mistakenly identify Joe as "Jane" whenever Joe speaks. Another problem arises when multiple users 10 located, e.g., in conference room 22, are using the same IHS 12 to participate in the teleconference, as shown in FIG. 1. Although currently available VOIP conferencing applications can identify the login source, user account/profile, phone number, etc. of the IHS 12 used by the multiple users 10 in conference room 22, they cannot identify which of the multiple users is actively speaking. As such, teleconference users may not recognize the active speaker unless they are familiar with the speaker's voice.

SUMMARY OF THE INVENTION

The present disclosure provides various embodiments of methods for intelligent active speaker identification and information handling systems (IHSs) utilizing such methods. In general, the methods disclosed herein may be used to accurately identify an active speaker in a communication session with an application or an IHS, regardless of whether the active speaker is alone, in a group environment, or using someone else's phone, computer or login to participate in the communication session. As described in more detail below, the active speaker may be accurately identified using voice processing technology and one or more voice identification databases (VIDs), which may be pre-existing, generated upon entering the communication session, and/or generated during the communication session.

In one respect, one or more of the methods disclosed herein may use voice processing technology and one or more VIDs to identify the active speaker in a communication session with a teleconferencing application (e.g., a VOIP teleconferencing application), and display the identity to other users or participants in the same communication session. In another respect, one or more of the methods disclosed herein may use voice processing technology and one or more VIDs to identify the active speaker in a communication session with another application (e.g., a media streaming service, a virtual assistant, a website, a game, etc.) or IHS (e.g., a computer, tablet, smart phone, game console, etc.), and dynamically switch between user profiles or accounts during the communication session based on the identity of the active speaker.

According to one embodiment, a method is disclosed herein for generating an active user VID. Such a method may include, for example, accessing a list of users associated with a communication session with an application or an IHS, comparing the list of users with user entries stored within a main VID, which may include a pre-recorded voice identifier and at least one associated alphanumeric identifier for each of a plurality of users, and storing, in an active user VID, the pre-recorded voice identifiers and associated alphanumeric identifiers obtained from the main VID for each user in the list having a matching entry in the main VID. In some embodiments, the method may further include determining a location of each user in the list, and storing the location of each user in the list in the active user VID. In some embodiments, at least one associated alphanumeric identifier may be selected from a group consisting of a user name, a phone number, an employee number, an Internet Protocol (IP) address, a teleconferencing application identifier, a device ID, and a user account/profile.

In some embodiments of the method, voice identification may be initiated for each user in the list that does not have a matching entry in the main VID and/or for any new user(s) that join the communication session but are not in the list. For example, the method may detect a predetermined keyword in a user's speech, and may initiate voice identification for the user only if the keyword is detected in the user's speech. If voice identification is initiated for a user, the method may process the user's speech to extract a voice identifier from the user's speech and associate the extracted voice identifier with the user's name, and may store the extracted voice identifier and the user's name in the active user VID. In some embodiments, the method may also determine a location of the user and storing the location of the user in the active user VID.

According to another embodiment, a method is provided herein for identifying an active speaker in a communication session with an application or an IHS. Such a method may include, for example, processing a user's speech to extract a voice identifier from the user's speech, comparing the extracted voice identifier with a plurality of voice identifiers stored within an active user, and identifying the user as an active speaker, if the extracted voice identifier matches one of the voice identifiers stored within the active user VID. Upon identifying the active speaker, the method may further include displaying the identity of the active speaker to other users participating in the communication session, or continuing the communication session using a user account/profile corresponding to the active speaker.

In some embodiments, the identity of the active speaker may be displayed to other users participating in the communication session by displaying the identity of the active speaker on a display screen of one or more IHSs used by the other users participating in the communication session. In some embodiments, the identity of the active speaker may be displayed to the other users participating in the communication session until speech from a different user in the communication session is detected or the communication session ends. If speech from a different user in the communication session is detected, the method may repeat the steps of processing, comparing, identifying and displaying for the different user.

In some embodiments, the method may determine if the active speaker is currently logged in to the application or the IHS under their own user account/profile. If the active speaker is currently logged in to the application or the IHS under their own user account/profile, the method may continue using the user account/profile corresponding to the active speaker. If the active speaker is not currently logged in to the application or the IHS under their own user account/profile, the method may dynamically switch to a different user account/profile corresponding to the active speaker. In some embodiments, the steps of processing, comparing, identifying and continuing may be performed only if a predetermined keyword is detected in the user's speech.

According to yet another embodiment, an information handling system (IHS) is provided herein to identify an active speaker in a communication session. As disclosed herein, such an IHS may generally include a microphone, a computer readable storage medium and a host processor. The microphone may be configured to receive user speech from a user participating in the communication session. The computer readable storage medium may be configured to store an active user VID comprising a pre-recorded voice identifier and at least one associated alphanumeric identifier for one or more users participating in the communication session. The host processor may be coupled to receive the user speech from the microphone, and may be further coupled to access program instructions and data stored within the computer readable storage medium.

In some embodiments, the host processor may be configured to execute a first set of program instructions to process the user speech received from the microphone and to extract a voice identifier from the user speech.

In some embodiments, the host processor may be configured to execute a second set of program instructions to compare the extracted voice identifier with the pre-recorded voice identifiers stored within the active user VID, and to identify the user as the active speaker in the communication session if the extracted voice identifier matches one of the pre-recorded voice identifiers stored within the active user VID. Upon identifying the user as the active speaker, the second set of program instructions may be further executable by the host processor to display the identity of the active speaker to other users participating in the communication session, or continue the communication session using a user account/profile corresponding to the active speaker.

In some embodiments, information handling system may further include a display screen coupled for displaying the identity of the active speaker, and a communication interface coupled, via one or more networks, to communicate the identity of the active speaker to one or more IHSs remotely located from the IHS. In some embodiments, the communication interface may communicate the identity of the active speaker to an application conducting the communication session, which notifies the other users participating in the communication session of the identity of the active speaker. In some embodiments, the application conducting the communication session is a Voice over IP (VOIP) teleconferencing application.

In some embodiments, the second set of program instructions may be further executable by the host processor to access a list of users associated with the communication session, compare the list of users with user entries stored within a main VID comprising a pre-recorded voice identifier and at least one associated alphanumeric identifier for each of a plurality of users, and store, in the active user VID, the pre-recorded voice identifiers and associated alphanumeric identifiers obtained from the main VID for each user in the list having a matching entry in the main VID.

In some embodiments, the second set of program instructions may be further executable by the host processor to determine if the active speaker is currently logged in to the IHS, or to an application conducting the communication session, under their own user account/profile. In such embodiments, the second set of program instructions may be further executable by the host processor to dynamically switch to a different user account/profile corresponding to the active speaker if the active speaker is not currently logged in to the IHS or the application under their own user account/profile. If the active speaker is currently logged in to the IHS or the application under their own user account/profile, the second set of program instructions may be further executable by the host processor to continue the communication session using the user account/profile corresponding to the active speaker.

BRIEF DESCRIPTION OF THE DRAWINGS

Other advantages of the present disclosure will become apparent upon reading the following detailed description and upon reference to the accompanying drawings in which.

DESCRIPTION OF ILLUSTRATIVE EMBODIMENTS

Figure 1:
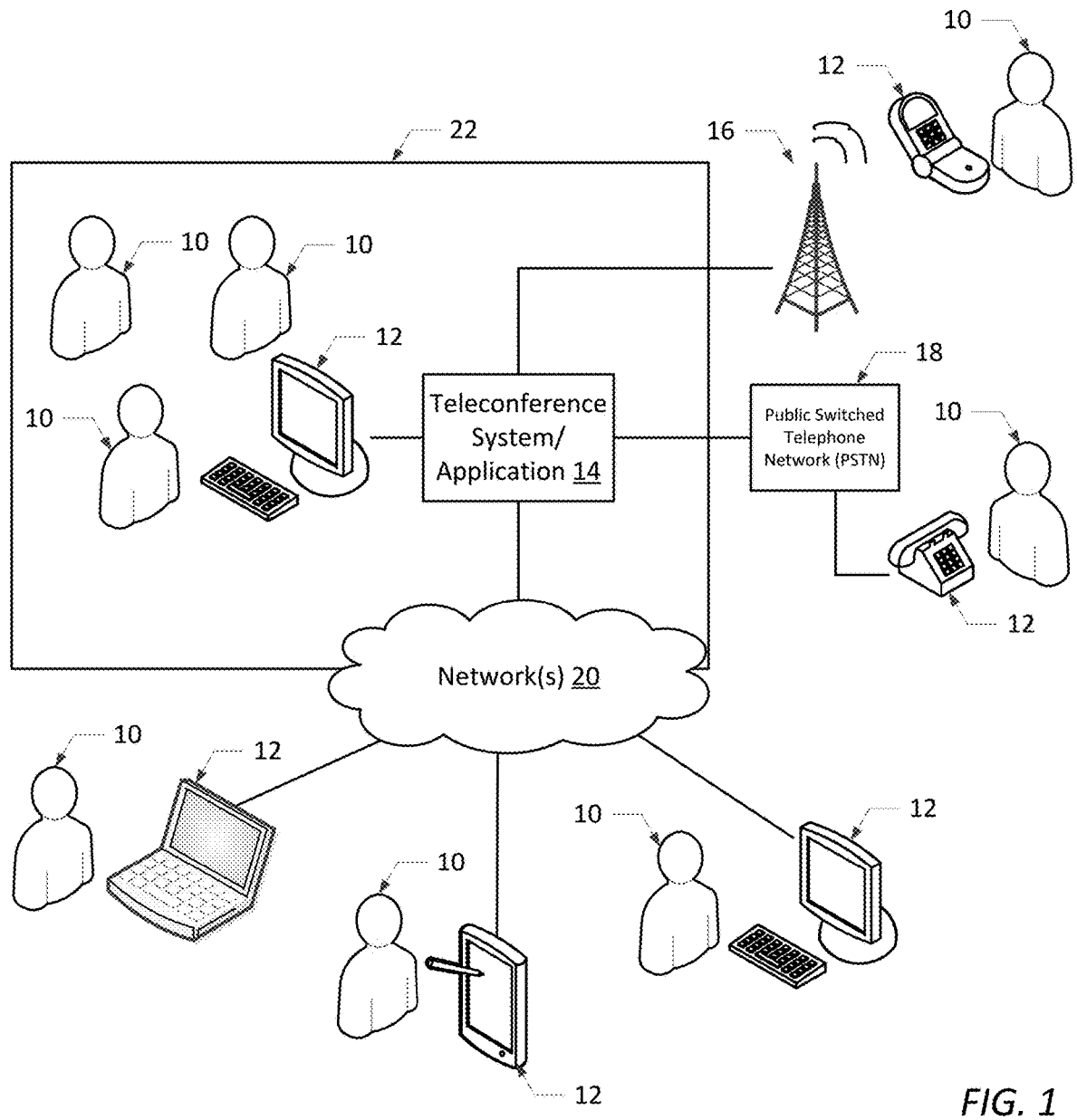
FIG. 1 (prior art) is a block diagram illustrating example ways in which users participating in a communication session (e.g., a teleconference meeting) may connect to the communication session using a variety of different information handling systems (IHSs) and communication technologies.

The present disclosure provides various embodiments of methods for intelligent active speaker identification and information handling systems (IHSs) utilizing such methods. In one respect, one or more of the methods disclosed herein may be used to accurately identify an active speaker in a communication session with an application or an IHS, regardless of whether the active speaker is alone, in a group environment, or using someone else's phone, computer or login to participate in the communication session. As described in more detail below, the active speaker may be accurately identified using voice processing technology and one or more voice identification databases (VIDs), which may be pre-existing, generated upon entering the communication session, or generated during the communication session.

In one respect, one or more of the methods disclosed herein may use voice processing technology and one or more VIDs to identify the active speaker in a communication session with a teleconferencing application, and display the identity to other users or participants in the same communication session. In another respect, one or more of the methods disclosed herein may use voice processing technology and one or more VIDs to accurately identify an active speaker in a communication session with an application (e.g., a media streaming service, such as Netflix, Hulu, etc.; a virtual assistant, such as Apple's Siri, Google Assistant, Amazon Alexa and Microsoft Cortana; productivity applications, such as Microsoft Office 360, Autodesk/AutoCAD or Adobe Creative Suite; a website; an online game; etc.) or an IHS (e.g., a computer, tablet, smart phone, game console, etc.), and to dynamically switch between user profiles or accounts during the communication session based on the identity of the active speaker.

Embodiments of the active speaker identification methods disclosed herein may utilize an active user VID to accurately identify the active speaker in a communication session. In some embodiments, the active user VID may include, but is not limited to, the names, locations and voice identifiers for each user in a list of users associated with the communication session. In some embodiments, the active user VID may be created by accessing a main VID comprising a plurality of pre-recorded voice identifiers for a plurality of users and storing, in the active user VID, the names, locations and voice identifiers for each user in the list having a matching voice identifier in the main VID. In other embodiments, a main VID may not exist and voice processing technology may be used to create the active user VID during the communication session. In some embodiments, the active user VID created during a communication session may be updated to include the names, locations and voice identifiers for any new users that join the communication session after it begins, even if such users were not originally included in the list of users.

By creating and using an active user VID that is unique to each communication session, the active speaker identification methods disclosed herein increase the accuracy and reduce the time and processing power needed to identify the active speaker in the communication session.

Figure 2:
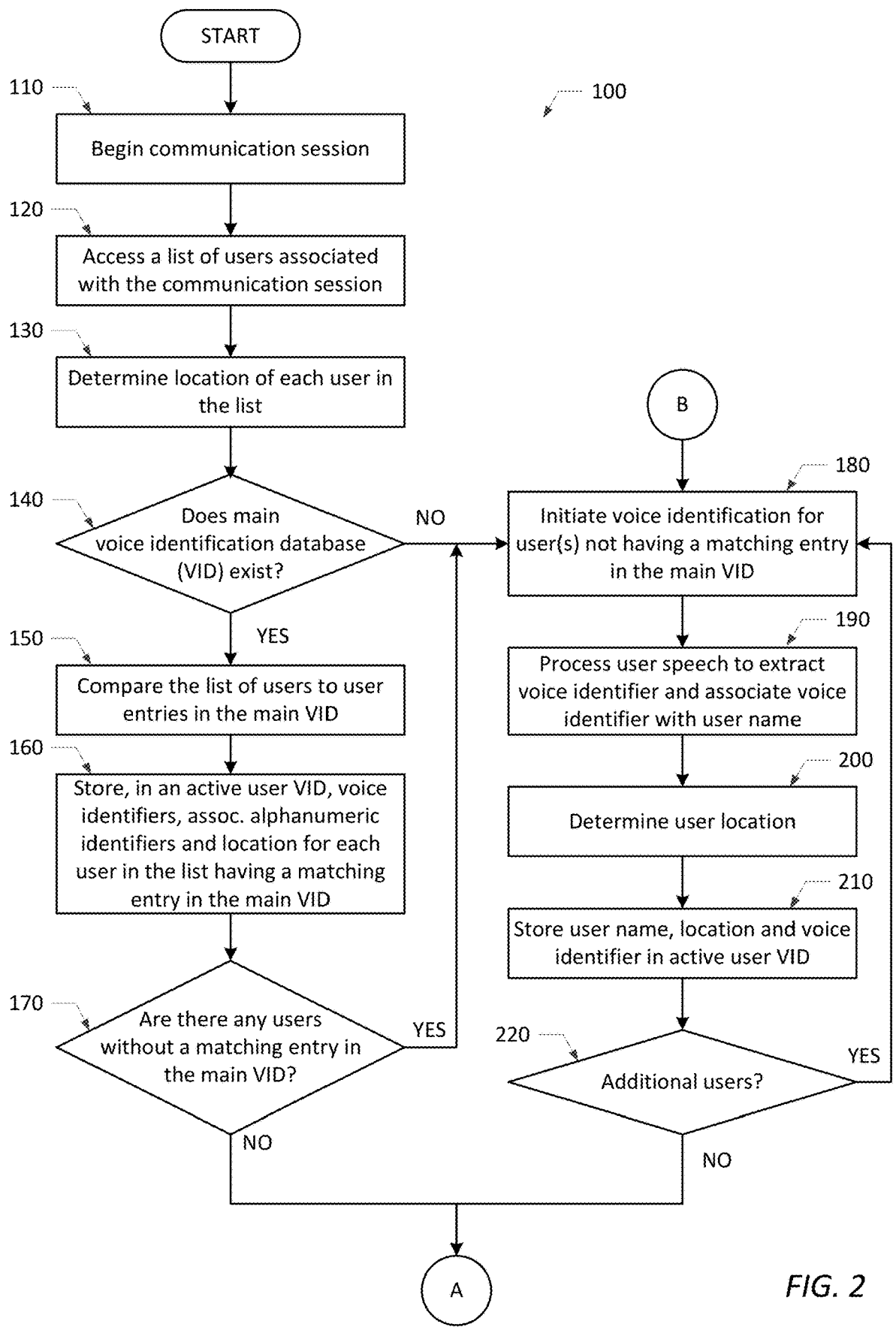
FIG. 2 is a flow chart diagram illustrating one embodiment of a method for creating an active user voice identification database (VID) of users associated with a communication session.

FIG. 2 illustrates one example embodiment of a method 100 to create an active user VID for one or more users associated with a communication session. In some embodiments, method 100 may begin when a communication session begins (in step 110). For example, method 100 may begin when one or more users login to or join a teleconference, video conference or web conference meeting, or login to or access a media streaming service, a virtual assistant, a website, an application, a game, etc. In other embodiments, one or more steps of the method shown in FIG. 2 may be performed before the communication session begins in step 110, so that an active user VID of intended users or participants is generated and stored prior to the communication session.

In step 120, method 100 accesses a list of users associated with the communication session. In one example, the list of users may include a list of participants invited to join a teleconference meeting. In another example, the list of users may include a list of user profiles or accounts associated with an information handling system (e.g., a computer, tablet, smart phone, game console, etc.) and/or an application (e.g., a media streaming service, a virtual assistant, a website, a game, etc.). The list of users accessed in step 120 is not restricted to any particular type of communication session, information handling system, or application, and may generally comprise a predetermined list of one or more users that are expected or allowed to participate in the current communication session. In some embodiments, the predetermined list of users may include the names of one or more users expected or allowed to participate in the current communication session. In some embodiments, additional contact and/or identifying information for each user may be included in the list of users, such as phone number, employee number, IP address, teleconferencing application identifier, device ID, user account/profile, etc.

In step 130, method 100 determines a location of each user in the list of users is determined in step 140. The user location may be a physical location (e.g., a country, state, city, address, building or room, etc.) or a source identifier (e.g., IP address, a teleconferencing application identifier, a phone number, a device ID, etc.). The user's location may be determined in step 130 using any known technique. In some embodiments, the user's location may be later used when identifying an active speaker and/or to control security features, as set forth in FIG. 3 and described below.

In step 140, method 100 determines whether or not a main voice identification database (VID) exists. As used herein, a main VID may include a pre-recorded voice identifier and at least one associated alphanumeric identifier (e.g., a name, phone number, employee number, IP address, teleconferencing application identifier, device ID, user account/profile, etc.) for each of a plurality of users. In one example, the main VID may include pre-recorded voice and alphanumeric identifiers for individuals associated with a business, facility or organization. In another example, the main VID may include pre-recorded voice and alphanumeric identifiers for individuals associated with an information handling system (e.g., a computer, a tablet, a smart phone, a game console, etc.) and/or an application (e.g., a teleconferencing application, a media streaming service, a virtual assistant, a website, an online game, etc.).

The pre-recorded voice identifiers stored within the main VID may be recorded at any time before the communication session begins in step 110 and may include analog or digital voice signatures, templates or models of each user's voice. The voice identifiers stored within the main VID are typically recorded during an enrollment phase that occurs prior to the methods disclosed herein. During enrollment of a particular user, the user's voice is recorded and a number of features are extracted to form a voice signature, template or model of the user's voice. A number of different voice identification technologies may be used to process the user's voice and generate the voice identifiers including, but not limited to, frequency estimation, hidden Markov models, Gaussian mixture models, pattern matching algorithms, neural networks, matrix representation, Vector Quantization and decision trees. As described in more detail below, one or more of the pre-recorded voice identifiers stored within the main VID may be later used to identify an active speaker.

If a main VID exists (YES branch of step 140), method 100 compares the list of users to user entries in the main VID (in step 150). For each user in the list having a matching entry in the main VID, method 100 stores the voice identifiers and associated alphanumeric identifiers obtained from the main VID in an active user VID (in step 160). In some embodiments, the user location determined in step 140 may also be stored in the active user VID for each user in the list having a matching entry in the main VID.

Compared to the main VID, which stores pre-recorded voice identifiers and associated alphanumeric identifiers for a potentially large number of users, the active user VID is dynamically generated in step 160 and contains only the voice identifiers and associated alphanumeric identifiers for the subset of users provided in the list of users and/or any users that may later join the communication session. In other words, the active user VID dynamically generated in step 160 is unique to the current communication session and contains voice identifiers and associated alphanumeric identifiers for only those users expected or actively participating in the current communication session.

If a main VID does not exist (NO branch of step 140), or if the method determines that there are users (e.g., users in the list or new users that are not on the list, but join the communication session after it begins) that do not have a matching entry in the main VID (NO branch of step 170), the method may perform steps 180-220 to dynamically generate, or add to, the active user VID.

In step 180, method 100 may initiate voice identification for each user in the list or each new user not having a matching entry in the main VID. In one embodiment, the method may detect a keyword spotter (KWS) function to initiate voice identification in step 180. A keyword spotter is a function that analyzes speech for a word, phrase or other spoken identifier, i.e., the keyword (otherwise referred to as a wake word or phrase) that causes an application to wake up or pay attention when the keyword is detected. Substantially any predetermined keyword may be used in step 180 to initiate voice identification for a user. In one example, voice identification may be initiated in step 180 when the phrase "Hi, my name is [Bob] . . . " is detected. Using a predetermined keyword to initiate voice identification prevents the method from constantly attempting to initiate voice identification each time a user speaks unless the keyword is detected.

In step 190, the user's voice is processed while speaking the keyword (or another phrase proceeding the keyword) to extract a voice identifier (e.g., an analog or digital voice signature, template or model of the user's voice) from the user's speech and associate the extracted voice identifier with the user's name. If, for example, the user says "Hi, my name is Bob . . . " to initiate voice identification in step 180, the user's speech may be processed using any known voice identification technique in step 190 to extract the voice identifier and associate it with the user name "Bob." In step 200, method 100 may determine the user's location, as described above in step 130.

In step 210, method 100 stores the user name, location and voice identifier of the user (e.g., Bob) in an active user VID. In step 220, method 100 determines if there are any additional users associated with the current communication session (e.g., any users in the list that do not have a matching entry in the main VID, or any new users that join the communication session after it begins) that should be added to the active user VID. If the method determines that additional users exist, steps 180-210 may be repeated to add each additional user to the active user VID. In some embodiments, steps 180-210 may be repeated throughout the communication session if/when new users join the communication session. When all users expected and/or actively participating in the communication session are accounted for and added to the active user VID (NO branches of steps 170 and 220), the method shown in FIG. 2 ends and proceeds (via step A) to one of the active speaker identification methods illustrated in FIGS. 3 and 4 and disclosed herein.

The present disclosure contemplates various ways in which an active user VID generated during a current communication session (as shown, e.g., in FIG. 2) can be used to identify an active speaker participating in the communication session. As explained above, the active user VID is unique to the current communication session and contains voice identifiers and associated alphanumeric identifiers for only those users expected and/or actively participating in the current communication session. By creating and using an active user VID that is unique to each communication session, the active speaker identification methods contemplated herein increase the accuracy and reduce the time and processing power needed to identify the active speaker in the communication session.

Figure 3:
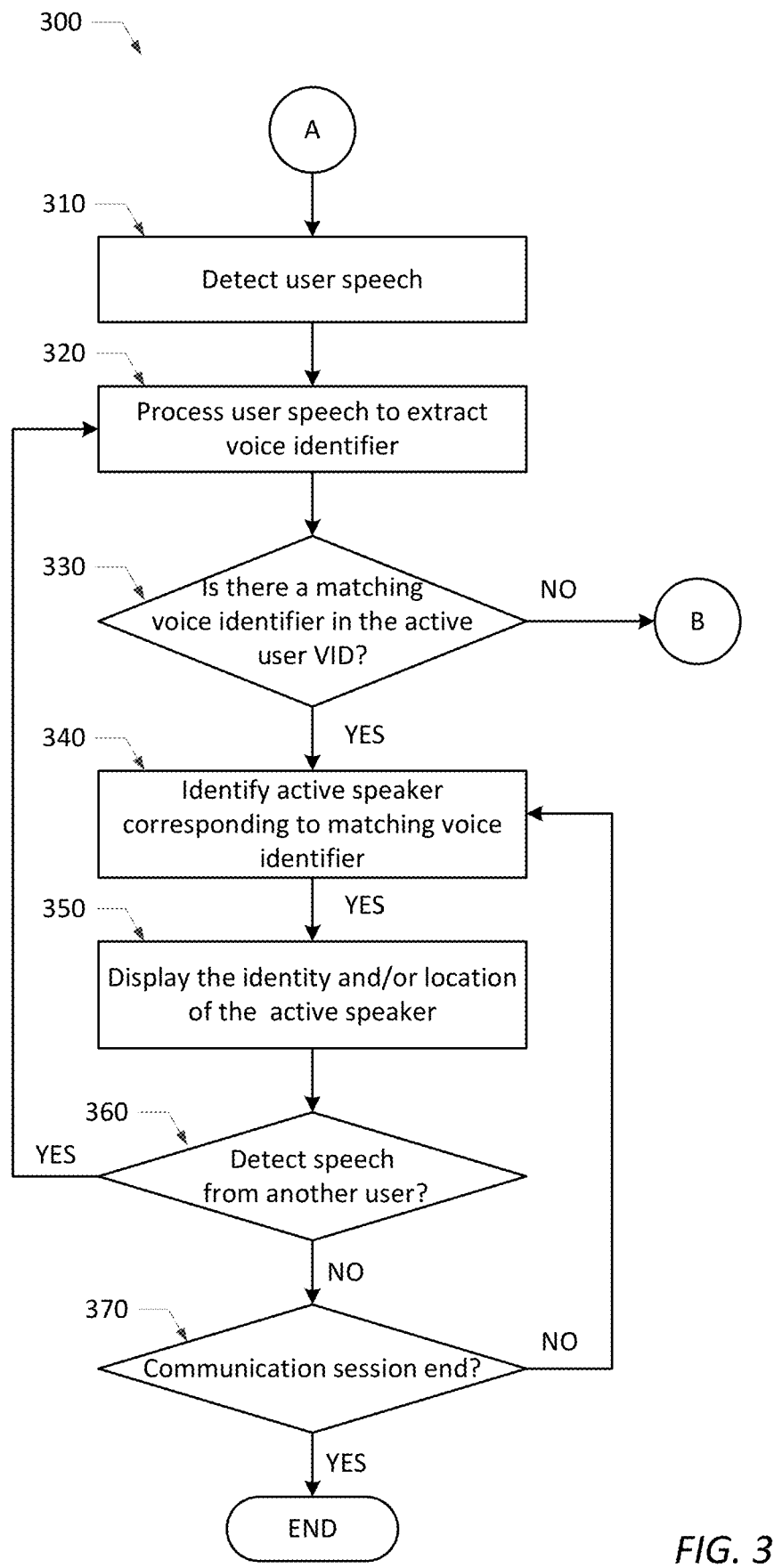
FIG. 3 is a flow chart diagram illustrating one embodiment of a method for using an active VID list to identify an active speaker in a communication session.

FIG. 3 is a flow chart diagram illustrating one embodiment of a method 300, which uses an active user VID to identify an active speaker in a communication session and displays the identity of the active speaker to other users in the communication session. In one embodiment, method 300 may be used to accurately identify an active speaker in a teleconference meeting. As illustrated in FIG. 1, participants 10 of the teleconference meeting may join the teleconference using a variety of different IHSs 12 (e.g., a telephone, cellular phone, tablet, laptop, desktop, etc.) and communication technologies/networks (e.g., a cellular network, PSTN, PAN, LAN, WAN etc.) to connect to and communicate with the teleconference system/application 14. Although not limited to such, teleconference system/application 14 may be a Voice over Internet Protocol ("Voice over IP", or "VOIP") conferencing application, such as Skype, WebEx, etc. It is understood, however, that the method shown in FIG. 3 is not strictly limited to identifying the active speaker in a teleconference meeting and may be used to identify the active speaker in other types of communication sessions.

The method shown in FIG. 3 begins at step A, and therefore, begins after the communication session begins and the active user VID for the current communication session is generated in FIG. 2. In one embodiment, method 300 may begin by detecting user speech (in step 310) and processing the user speech to extract a voice identifier for the user currently speaking (in step 320). A number of different voice identification technologies may be used to process the user's speech and extract a voice identifier (in step 320) including, but not limited to, frequency estimation, hidden Markov models, Gaussian mixture models, pattern matching algorithms, neural networks, matrix representation, Vector Quantization and decision trees. The voice identifier extracted in step 320, which may include an analog or digital voice signature, template or model of the current user's speech, is compared to the voice identifiers stored within the active user VID (in step 330). If the voice identifier extracted in step 320 does not match any of the voice identifiers stored in the active user VID (NO branch of step 330), the method may assume that a new user has joined the teleconference and may proceed (via step B) to steps 180-210 of the method 100 shown in FIG. 2 to initiate voice identification of the new user and add the new user name, location and voice identifier to the active user VID.

If the voice identifier extracted in step 320 does match a voice identifier stored in the active user VID (YES branch of step 330), the method may use the active user VID to identify the active speaker corresponding to the matching voice identifier (in step 340). In step 350, the identity of the active speaker may be displayed to other users/participants of the communication session. In some embodiments, for example, the user name of the active speaker may be displayed (in step 350) on display screens of the IHSs 12 used by other users/participants 10 in the teleconference meeting. In some embodiments, the user's location may be displayed along with the user name. For example, if the active speaker is located in conference room 22 of FIG. 1, the conference room name or number may be displayed along with the user's name (in step 350). In another embodiment, a photograph of the active speaker may be displayed (in step 350) in addition, or alternative, to displaying the user name. The photograph of the active speaker may be obtained, for example, from the active user VID, the main VID, a corporate directory/database, the teleconferencing system/application, the user's IHS, etc. In yet other embodiments, other visual and/or auditory means may be used to display the identity of the active speaker to the other meeting participants (in step 350).

In some embodiments, the user's location may be used to control one or more security features for the communication session and/or the active speaker identification methods disclosed herein. For example, if a user is participating in the teleconference meeting from a public location (e.g., a restaurant, airport, etc.), method 300 may implement one or more security features based on the user's location. In one example implementation, method 300 may warn the user to be careful when conducting confidential discussions in a public location. In another example implementation, method 300 may automatically disconnect the user from the communication session if the user's location is determined to be public and/or insecure.

Method 300 may continue to identify the user/participant currently speaking as the active speaker until another user/participant speaks (in step 360) or the communication session ends (in step 370). If method 300 detects speech from another user/participant (YES branch of step 360), the method may repeat steps 320-350 to identify the active speaker and display the identity (and optionally, the location) of the active speaker to the other users/participants of the communication session. Method 300 ends when the communication session ends (YES branch of step 370).

Unlike conventional teleconferencing systems/applications, the method shown in FIG. 3 may be used to accurately identify the person actively speaking in the teleconference (e.g., by name, photograph, etc.), regardless of whether the active speaker is alone, in a group environment, or using someone else's phone, computer or login to participate in the teleconference meeting. This is achieved in method 300 by using voice identification technology to process user speech and extract a voice identifier from the user's speech, and by comparing the extracted voice identifier to voice identifiers stored along with other user identifying information within an active user VID.

Figure 4:
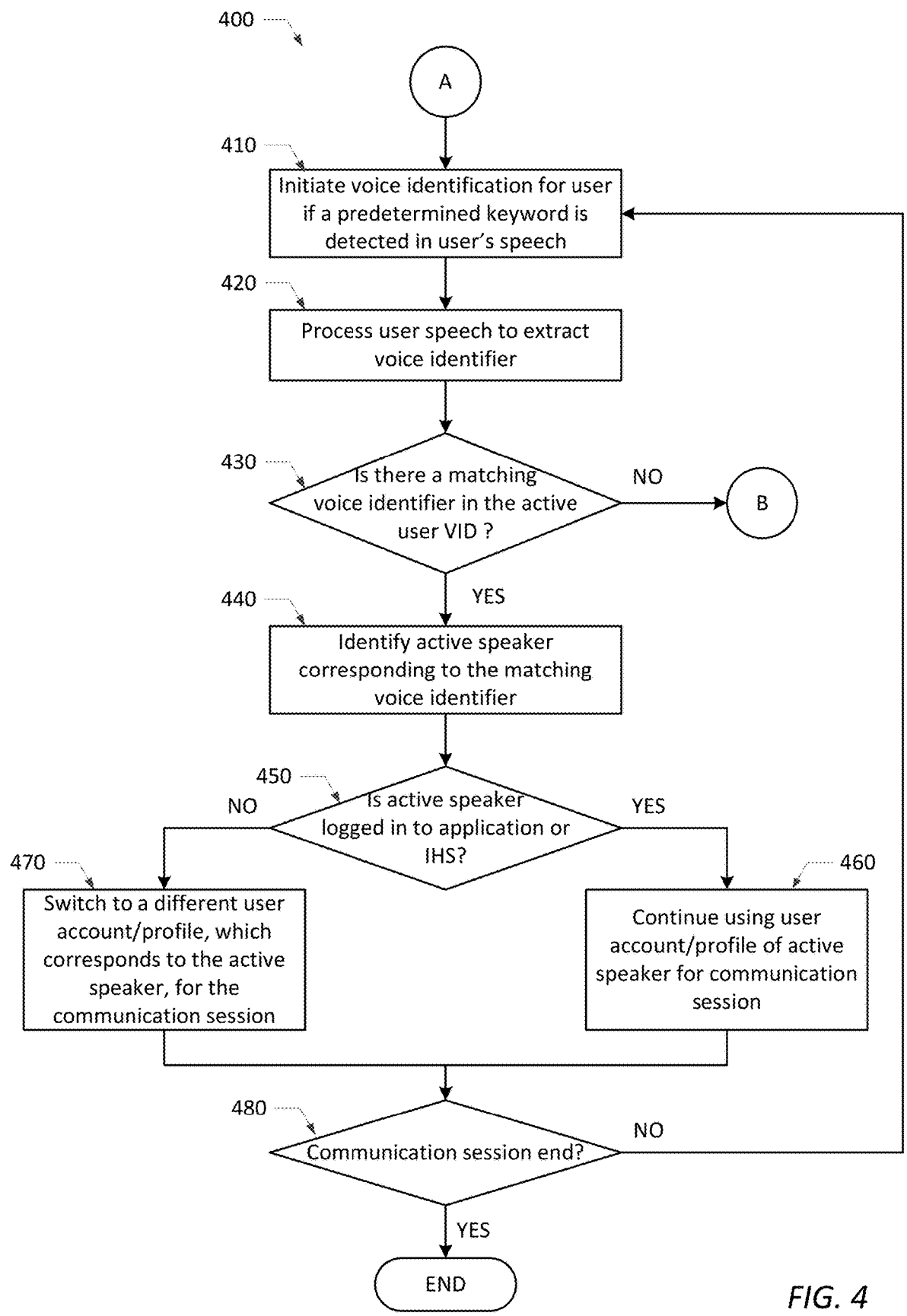
FIG. 4 is a flow chart diagram illustrating one embodiment of a method for using an active user VID to dynamically switch between user profiles or accounts during the communication session based on the identity of the active speaker.

FIG. 4 is a flow chart diagram illustrating one embodiment of another method 400, which uses an active user VID to identify an active speaker in a communication session and dynamically switch to a different user profile/account during the same communication session. In one embodiment, method 400 may be used to accurately identify an active speaker to an application (e.g., a media streaming service, a virtual assistant, a website, a game, etc.), or to an information handling system (e.g., a computer, tablet, smart phone, game console, etc.), and to use the identity of the active speaker to dynamically switch to the user account/profile associated with the active speaker. Like method 300, method 400 assumes that a communication session with an application (or an IHS) has begun and an active user VID has been generated for the current communication session.

Assume, for example, that user A has begun a communication session with a media streaming service, such as Netflix, Hulu, etc., and an active user VID containing a voice identifier and other user identifying information has been generated and stored for user A and potentially other users of the media streaming service. In such an example, method 400 may use voice identification technology and the active user VID generated for the current communication session to identify user A and dynamically switch to the user account/profile associated with user A, if user A is not currently logged in to the media streaming service. If, for example, another user (e.g., user B) joins the current communication session and requests a user account/profile change (e.g., by speaking a predetermined keyword or phrase), method 400 may use voice identification technology and the previously generated active user VID (or an updated active user VID) to identify user B and dynamically switch from user A's account/profile to the user account/profile associated with user B.

The present disclosure contemplates other ways in which the method 400 shown in FIG. 4 may be used to accurately identify an active speaker and use the identity of the active speaker to dynamically switch to the user account/profile associated with the active speaker. In one example implementation, method 400 may be used to identify an active speaker to a virtual assistant, which collects, organizes and/or has access to information and/or accounts (e.g., calendar events, email, voicemail, media content, etc.) associated with one or more users. Upon identifying an active speaker, method 400 may continue using or switch to the user account/profile corresponding to the active speaker, so that the virtual assistant may display or present information pertaining to the active speaker. In another example implementation, method 400 may be used to identify an active speaker to an IHS, which is used/shared by multiple users/employees. The shared IHS may be located in a public or corporate location (e.g., on a factory floor, an office environment, a restaurant or store) and may be configured to run one or more user applications. Upon identifying an active speaker, method 400 may continue using or switch to the user account/profile corresponding to the active speaker, so that the shared IHS may provide the active speaker with access to the user applications.

It is noted that the method shown in FIG. 4 is not limited to only the example use cases mentioned herein. Regardless of use case, the method shown in FIG. 4 may simplify the process of switching between user accounts/profiles, from the user's perspective, by only requiring the user to voice his/her request for an account/profile change. In some embodiments, the method shown in FIG. 4 may eliminate any requirement on the user to manually login or switch to their own account/profile (via, e.g., passwords, biometric identification, security badge, etc.). In other embodiments, the method shown in FIG. 4 may be used to augment security features by adding voice identification to a login procedure used to gain access to an application or IHS.

As shown in FIG. 4, method 400 may begin by initiating voice identification for a user if a predetermined keyword is detected in the user's speech (in step 410). In one example, voice identification may be initiated in step 410 when the phrase "Switch to [Bob's] account . . . " is detected. It is noted, however, that any predetermined keyword may be used in step 410 to initiate voice identification for a user. Using a predetermined keyword to initiate voice identification prevents the method from constantly attempting to initiate voice identification each time a user speaks unless the predetermined keyword is detected in step 410.

In step 420, method 400 processes the user speech to extract a voice identifier for the user currently speaking. As described above, a number of different voice identification technologies may be used to process the user's speech and extract a voice identifier. The voice identifier extracted in step 420, which may include an analog or digital voice signature, template or model of the current user's speech, is compared to the voice identifiers stored within the active user VID (in step 430). If the voice identifier extracted in step 420 does not match any of the voice identifiers stored in the active user VID (NO branch of step 430), the method may assume in some embodiments that a new user has joined the communication session and may proceed (via step B) to steps 170-200 of the method 100 shown in FIG. 2 to initiate voice identification of the new user and add the new user name, location and voice identifier to the active user VID. In other embodiments, the user may be denied access to the application or IHS if the voice identifier extracted in step 420 does not match any of the voice identifiers stored in the active user VID.

If the voice identifier extracted in step 420 does match a voice identifier stored in the active user VID (YES branch of step 430), the method may use the active user VID to identify the active speaker corresponding to the matching voice identifier (in step 440). Unlike method 300, which may display the identity of the active speaker to other participants in the communication session, method 400 identifies the active speaker to the application or IHS conducting the communication session.

In step 450, the method determines if the active speaker is currently logged in to the application or IHS conducting the communication session. If the active speaker is currently logged in (YES branch of step 450), the method may continue using the user account/profile of the active speaker for the current communication session (in step 460). If the active speaker is not currently logged in (NO branch of step 450), the method may dynamically switch to a different user account/profile corresponding to the active speaker for the current communication session (in step 470). The method shown in FIG. 4 may end if the current communication session ends (YES branch of step 480). If the communication session continues (NO branch of step 480), steps 410-470 of the method shown in FIG. 4 may be repeated if a KWS is again detected.

It will be understood that the illustrated steps of the methods shown in FIGS. 2-4 are exemplary only, and that any other combination of additional and/or alternative steps may be employed that are suitable for generating an active user VID for a current communication session, using the active user VID to identify active speaker(s) in the current communication session, and either displaying the identity of the active speaker to other users participating in the communication session or dynamically switching to the user account/profile corresponding to the active speaker without any further action on the part of the active speaker.

Figure 5:
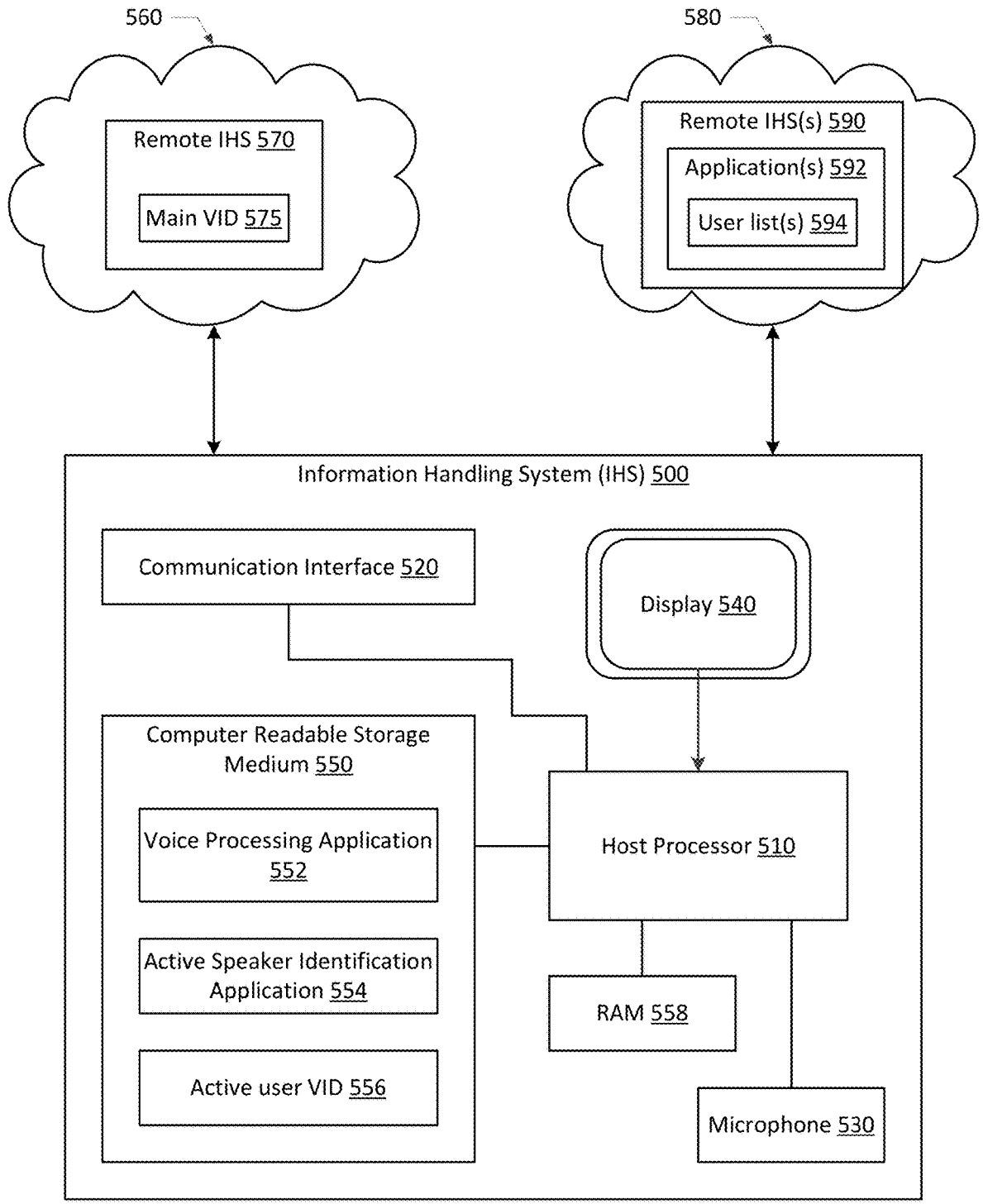
FIG. 5 is a block chart diagram illustrating one embodiment of an IHS configured to implement the methods shown in FIGS. 2-4.
Figure 6:
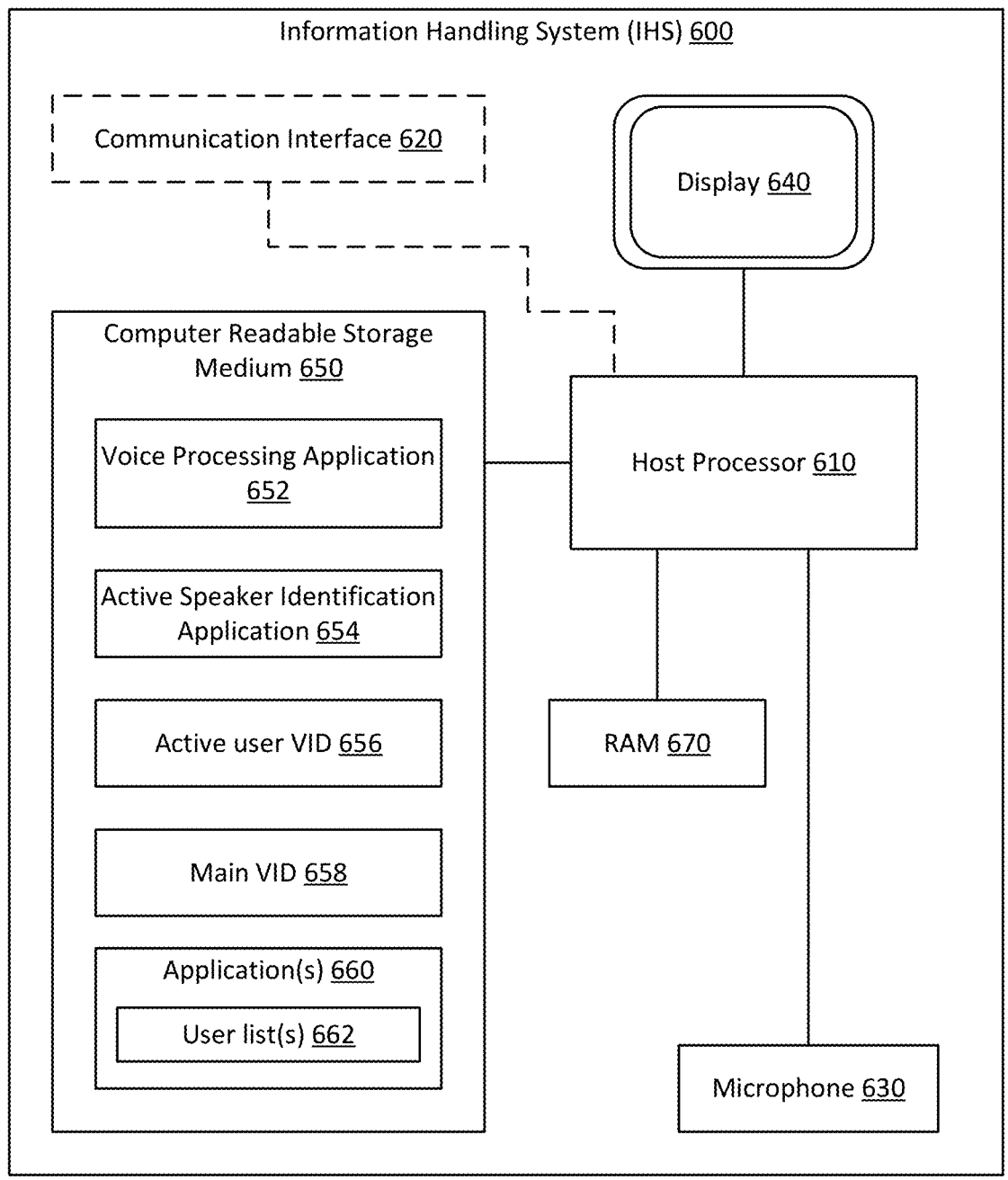
FIG. 6 is a block chart diagram illustrating another embodiment of an IHS configured to implement the methods shown in FIGS. 2-4.

It will be further understood that the methods shown in FIGS. 2-4 and described herein may be implemented, e.g., as software or firmware, which is stored on a non-transitory tangible computer readable storage medium and executed by a processing device (e.g., a CPU, controller, microcontroller, processor, microprocessor, FPGA, ASIC, or other suitable processing device) of an information handling system (IHS). In one embodiment, the methods shown in FIGS. 2-4 may be implemented as program instructions stored locally within a user's IHS (e.g., a client device), as shown in FIGS. 5 and 6 and described below. Alternatively, program instructions implementing one or more of the methods shown in FIGS. 2-4 may be stored within another IHS (e.g., a network storage device or server), which is remotely located from, yet communicatively coupled to, the user's IHS. The present disclosure is intended to cover all such embodiments and derivations.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory.

Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

FIGS. 5 and 6 provide block diagrams of information handling systems (IHSs) 500/600 according to various embodiments of the present disclosure. IHSs 500/600 are client devices and may be implemented as, e.g., a desktop computer, a notebook computer, a laptop computer, a tablet computer, a mobile phone, a personal data assistant (PDA), a game console, a smart speaker, teleconference system, etc. It is expressly noted that the IHS configurations shown in FIGS. 5 and 6 are exemplary only, and that the disclosed methods may be implemented on substantially any type and/or configuration of information handling system. It will be further understood that while certain components of IHSs 500/600 are shown in FIGS. 5 and 6 for illustrating embodiments of the present disclosure, the information handling systems disclosed herein are not restricted to including only those components shown in FIGS. 5 and 6 and described below.

FIG. 5 illustrates one example embodiment of an IHS 500, which is configured to implement the methods shown in FIGS. 2-4. In the example shown in FIG. 5, IHS 500 generally includes at least one host processor 510, at least one communication interface 520 to facilitate communication with remotely located systems and/or devices, a microphone 530 for receiving auditory input (e.g., user speech) from a user, a display screen 540 for displaying auditory and visual output (e.g., the identity of an active speaker in a communication session), and a computer readable storage medium 550 for storing program instructions and data, which in one embodiment, may be used to implement the methodologies shown in FIGS. 2-4.

Host processor 510 may include substantially any processing device capable of executing program instructions or computer program code. For example, host processor 510 may include various types of programmable integrated circuits (e.g., a processor, controller, microcontroller, microprocessor, ASIC, etc.) or programmable logic devices (e.g., a field programmable gate array "FPGA", complex programmable logic device "CPLD", etc.). In one embodiment, host processor 510 may include at least one central processing unit (CPU) having one or more processing cores. In other embodiments, host processor 510 may include other types of processing devices including, but not limited to, a graphics processing unit (GPU), a graphics-derivative processor (such as a physics/gaming processor), a digital signal processor (DSP), etc.

Communication interface 520 enables IHS 500 to communicate with other devices, systems and/or services via one or more external networks 560/580 using one or more communication protocols. Communication interface 520 may communicate data and signals to/from IHS 500 using any known communication protocol. Networks 560/580 may be local area networks (LANs), wide area networks (WANs), personal area networks (PANs), or the like, and the connection to and/or between IHS 500 and networks 560/580 may be wired, wireless or a combination thereof. For purposes of this discussion, networks 560/580 are each illustrated as a single collective component for simplicity. However, it is appreciated that networks 560/580 may comprise one or more direct connections to other devices, as well as a more complex set of interconnections as can exist within a wide area network, such as the Internet. In some embodiments, networks 560/580 may be a single network.

In the embodiment shown in FIG. 5, communication interface 520 is coupled, via network 560, to receive or access a main VID 575 stored, for example, within another IHS 570 remotely located from IHS 500. In one embodiment, remotely located IHS 570 may be a network storage device or server (e.g., a database server, a file server, a computing server, etc.) configured for storing software and/or data, such as main VID 575. As noted above, main VID 575 may be configured to store a pre-recorded voice identifier and at least one associated alphanumeric identifier (e.g., a name, phone number, employee number, IP address, teleconferencing application identifier, device ID, user account/profile, etc.) for each of a plurality of users. In one example, main VID 575 may include pre-recorded voice and alphanumeric identifiers for individuals associated with a business, facility or organization. In another example, main VID 575 may include pre-recorded voice and alphanumeric identifiers for individuals associated with one or more IHSs (e.g., one or more computers, tablets, smart phones, game consoles, etc.). In yet another example, main VID 575 may include pre-recorded voice and alphanumeric identifiers for individuals associated with a particular application (e.g., a teleconferencing application, a media streaming service, a virtual assistant, a website, an online game, etc.).

In the embodiment shown in FIG. 5, communication interface 520 is further coupled, via network 580, to communicate with one or more user applications 592 stored and/or executed within one or more IHSs 590 remotely located from IHS 500. In one embodiment, remotely located IHS(s) 590 may be a network storage device or a server (e.g., an application server, a web server, an exchange server, a file server, a computing server, etc.) configured for storing software and/or data, such as user application(s) 592. In another embodiment, remotely located IHS(s) 590 may represent the IHSs (e.g., one or more computers, tablets, smart phones, game consoles, etc.), which are used by other users to participate in the communication session. In the latter embodiment, IHS 500 may be configured to store its own local copy of the user application(s), as shown in the example embodiment of FIG. 6.

As shown in FIG. 5, user application(s) 592 may comprise a list of users 594 associated with a particular communication session with the user application(s) 592. For example, if user application(s) 592 comprise a teleconferencing application (e.g., a VOIP teleconferencing application), the list of users 594 may include a list of participants that were invited to join a particular teleconference meeting. In another example, the list of users may include a list of user profiles or accounts associated with a particular IHS (e.g., a particular computer, tablet, smart phone, game console, a smart speaker, etc.) and/or with a particular application (e.g., a media streaming service, a virtual assistant, a productivity application, a website, an online game, etc.) executable by or accessible to the IHS. In some embodiments, IHS 500 may receive or access the list of users 594 via communication interface 520.

It is noted that although remotely located IHSs 570 and 590 are illustrated in FIG. 5 as separate entities, which are communicatively coupled to IHS 500 via separate networks 560/580, the present disclosure is not strictly limited to such a configuration. In some embodiments, main VID 575, user application(s) 592 and user list 594 may be stored within a single IHS, or a plurality of IHS s, which are remotely located yet communicatively coupled to IHS 500 via a single network.

Computer readable storage medium 550 is coupled to host processor 510 and generally configured to store software and/or data. Computer readable storage medium 550 may be any type of persistent, non-transitory computer readable storage medium, including but not limited to, one or more hard disk drives (HDDs) or solid-state drives (SSDs). In the embodiment shown in FIG. 5, computer readable storage medium 550 is configured to store voice processing application software 552, active speaker identification application software 554 and an active user VID 556 (once generated for each communication session). In one alternative embodiment, active user VID 556 may instead be stored within random access memory (RAM) 558 (or another type of volatile memory) to improve the speed with which host processor 510 may access the active user VID 556 stored therein.

The voice processing application software 552 and active speaker identification application software 554 stored within computer readable storage medium 550 contain program instructions (or computer program code) that may be executed by host processor 510 to perform the methodologies shown in FIGS. 2-4. For example, voice processing application software 552 may contain a first set of program instructions, which may be executed by host processor 510 to process the user's speech (received, e.g., via microphone 530) and extract a voice identifier, as set forth in steps 180, 320 and 420 of the methods shown in FIGS. 2-4. Voice processing application software 552 may use a number of different voice identification technologies to process the user's speech and extract a voice identifier, as indicated above.

Active speaker identification application software 554 may contain a second set of program instructions that may be executed by host processor 510 to generate an active user VID for a current communication session (as shown in FIG. 2), use the active user VID to identify active speaker(s) in the current communication session, and either display the identity of the active speaker(s) to other users participating in the communication session (as shown in FIG. 3) or continue the communication session using the user account/profile corresponding to the active speaker (as shown in FIG. 4).

In some embodiments, the second set of program instructions within active speaker identification application software 554 may be executed by host processor 510 to access a list of users 594 associated with a particular communication session with the user application(s) 592, compare the list of users with user entries stored within main VID 575, and store, within an active user VID 556 for the current communication session, the pre-recorded voice identifiers and associated alphanumeric identifiers obtained from main VID 575 for each user in the list 594 having a matching entry in the main VID. In some embodiments, program instructions within active speaker identification application software 554 may be executed by host processor 510 to add voice identifiers and associated alphanumeric identifiers for additional users associated with the current communication session (e.g., any users in the list that do not have a matching entry in the main VID, or any new users that join the communication session after it begins) to the active user VID, as noted above with regard to steps 180-220 of FIG. 2.

In some embodiments, the second set of program instructions within active speaker identification application software 554 may be executed by host processor 510 to use voice processing application software 552 and active user VID 556 to identify the active speaker in the communication session, and display the identity of the active speaker on a display screen 540 of IHS 500. In some embodiments, the identity of the active speaker may be communicated, e.g., via communication interface 520 of IHS 500, to the user application 592 (e.g., a VOIP teleconferencing application) conducting the communication session so that other users participating in the communication session can be notified or made aware of the identity of the active speaker. In other embodiments, communication interface 520 may communicate the identity of the active speaker directly to one or more IHSs, which are used by the other users to participate in the communication session. In some embodiments, the identity of the active speaker may be displayed in a variety of different ways (e.g., by user name, location, photograph, and/or other visual or auditory means) on the display screens of IHSs used by one or more users participating in the communication session, as noted above with regard to step 350 of FIG. 3. In other embodiments, the identity and/or location of the active speaker may be used to login to an application or IHS and/or to control or augment one or more security features for the current communication session, application or IHS.

In some embodiments, the second set of program instructions within active speaker identification application software 554 may be executed by host processor 510 to determine if the active speaker is currently logged in to user application 592 or IHS 500 under their own user account/profile. If the active speaker is currently logged in to user application 592 or IHS 500 under their own user account/profile, the communication session may continue using the user account/profile corresponding to the active speaker. If the active speaker is not currently logged in to user application 592 or IHS 500 under their own user account/profile, program instructions within active speaker identification application software 554 may be executed by host processor 510 to dynamically switch to a different user account/profile corresponding to the active speaker.

FIG. 6 illustrates another embodiment of an IHS 600, which is configured to implement the methods shown in FIGS. 2-4. IHS 600 is similar to IHS 500 in that it includes at least one host processor 610, a microphone 630 for receiving auditory input (e.g., user speech) from a user, a display screen 640 for displaying auditory and visual output (e.g., the identity of an active speaker in a communication session), and a computer readable storage medium 650 for storing program instructions and data that may be used to implement the methods shown in FIGS. 2-4. Host processor 610 and computer readable storage medium 650 may be implemented as described above with regard to FIG. 5. In IHS 600, communication interface 620 is depicted as an optional component, which may be included but not strictly needed to implement the methods disclosed herein.

In the embodiment shown in FIG. 6, computer readable storage medium 650 is configured to store voice processing application software 652, active speaker identification application software 654, an active user VID 656 (once generated for each communication session), a main VID 658 and one or more user applications 660, each having one or more user lists 662. As such, the IHS 600 shown in FIG. 6 generally differs from the IHS 500 shown in FIG. 5 by storing all of the software and data structures needed to implement the methodologies shown in FIGS. 2-4. In some embodiments, active user VID 656 may alternatively be stored within random access memory (RAM) 670 (or another type of volatile memory), as noted above with regard to FIG. 5.

FIGS. 5 and 6 illustrate how the active speaker identification methods disclosed herein may be performed locally by a client device (e.g., IHS 500 or 600), according to various embodiments of the present disclosure. It is noted, however, that the methods disclosed herein are not strictly limited to client devices and may be alternatively performed by another IHS (e.g., IHS 570 and/or IHS 590) remotely located from, yet communicatively coupled to, the client device. In one alternative embodiment, all software and data structures needed to implement the methodologies shown in FIGS. 2-4 (e.g., voice processing application software 552/652, active speaker identification application software 554/654, active user VID 556/656, main VID 575/658, and user applications 592/660 having user lists 594/662) may be stored and executed in one or more remotely located IHSs (e.g., within IHS 570 and/or IHS 590), and IHS 500 may be used primarily to receive auditory input (e.g., user speech via microphone 530) and commands (via communication interface 520) from the one or more remotely located IHSs for responding to such auditory input.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A method for generating an active user voice identification database (VID), the method comprising:
    accessing a list of users associated with a communication session with an application or an information handling system (IHS);
    comparing the list of users with user entries stored within a main voice identification database (VID), the main VID comprising a pre-recorded voice identifier and at least one associated alphanumeric identifier for each of a plurality of users;
    storing, in an active user VID, the pre-recorded voice identifiers and associated alphanumeric identifiers obtained from the main VID for each user in the list having a matching entry in the main VID; and
    initiating voice identification for at least one given user associated with the communication session that does not have a matching entry in the main VID by:
        receiving user speech from the given user,
        initiating the voice identification for the given user only if a predetermined keyword is detected in the speech of the given user,
        processing the speech of the given user while speaking the predetermined keyword to extract a voice identifier from the speech of the given user,
        associating the extracted voice identifier with a name of the given user, and
        adding to the active user VID by storing the extracted voice identifier and the name of the of the given user in the active user VID.

2. The method as recited in claim 1, wherein the at least one associated alphanumeric identifier is selected from a group consisting of a user name, a phone number, an employee number, an Internet Protocol (IP) address, a teleconferencing application identifier, a device ID, and a user account/profile.

3. The method as recited in claim 1, further comprising:
    determining a location of each user in the list; and
    storing the location of each user in the list in the active user VID.

4. The method as recited in claim 1, further comprising performing the initiating voice identification for each given user in the list that does not have a matching entry in the main VID and/or for any new given users that join the communication session but are not in the list.

5. The method as recited in claim 1, further comprising:
    determining a location of the given user; and
    storing the location of the given user in the active user VID.

6. The method as recited in claim 1, where the given user is not in the list.

7. The method as recited in claim 1, where the given user is in the list but does not have a matching entry in the main VID.

8. The method as recited in claim 1, where the accessing, comparing, and storing are performed before the communication session begins.

9. The method as recited in claim 1, where the list of users is a predetermined list of users that are allowed to participate in the communication session.

10. The method as recited in claim 1, where the list of users is a list of user profiles or accounts that are associated with the IHS.

11. The method as recited in claim 1, further comprising recording the pre-recorded voice identifier for each of the plurality of users of the main VID before the communication session begins.

12. The method as recited in claim 11, where the recording the pre-recorded voice identifier for each of the plurality of users of the main VID comprises recording a voice of each of the plurality of users of the main VID before the communication session begins.

13. The method as recited in claim 1, where the generated active VID contains voice identifiers that correspond to only a subset of the user entries stored within the main VID.

14. The method as recited in claim 1, further comprising:
    determining if any new users join the communication session any time after it begins; and
    then repeating the initiating of the voice identification for each given new user when it is determined that the given new user has joined the communication session after it begins.

15. The method as recited in claim 1, further comprising conducting the communication session using a Voice over IP (VOIP) teleconferencing application.

16. The method as recited in claim 1, where the list of users is stored on a remote second information handling system coupled across a network to a first information handling system; where the main VID is stored on a separate and different remote third information handling system coupled across the network to the first information handling system; and where the method further comprises executing a host programmable integrated circuit of the first information handling system to generate the active user VID on the first information handling system by:
    accessing, across the network, the list of users on the remote second information handling system;
    accessing, across the network, the main VID on the remote third information handling system; and performing the comparing, storing, and initiating voice identification on the first information handling system.

17. The method as recited in claim 1, where the list of users and the main VID are each stored on a same information handling system; and where the method further comprises executing a host programmable integrated circuit of same information handling system to generate the active user VID on the same information handling system by:
- accessing the list of users on the same information handling system;
- accessing the main VID on the same information handling system; and
- performing the comparing, storing, and initiating voice identification on the same information handling system.

\* \* \* \* \*